(12) United States Patent
Wilkes (10) Patent No.: US 10,619,716 B2
(45) Date of Patent: Apr. 14, 2020

(54) GEARBOX ASSEMBLY FOR AN ELECTRIC POWER STEERING ASSEMBLY

(71) Applicant: TRW Limited, Solihull, West Midlands (GB)

(72) Inventor: Mark Anthony Wilkes, Birmingham (GB)

(73) Assignee: TRW Limited, Solihull, West Midlands (GB)

( * ) Notice: Subject to any disclaimer, the term of this patent is extended or adjusted under 35 U.S.C. 154(b) by 238 days.

(21) Appl. No.: 15/560,503

(22) PCT Filed: Mar. 21, 2016

(86) PCT No.: PCT/GB2016/050779
§ 371 (c)(1),
(2) Date: Sep. 22, 2017

(87) PCT Pub. No.: WO2016/151305
PCT Pub. Date: Sep. 29, 2016

(65) Prior Publication Data
US 2018/0058555 A1    Mar. 1, 2018

(30) Foreign Application Priority Data
Mar. 24, 2015   (GB) .................................. 1504960.4

(51) Int. Cl.
*F16H 35/06*       (2006.01)
*B62D 5/04*        (2006.01)
(Continued)

(52) U.S. Cl.
CPC ........... *F16H 35/06* (2013.01); *B62D 5/0403* (2013.01); *B62D 5/0409* (2013.01); *F16H 1/16* (2013.01);
(Continued)

(58) Field of Classification Search
CPC ...... F16H 35/06; F16H 57/021; F16H 57/039; B62D 5/0403; B62D 5/0409
See application file for complete search history.

(56) References Cited

U.S. PATENT DOCUMENTS 10,252,742 B2 *  4/2019  Schlegel .............. B62D 5/0409
2007/0125193 A1  6/2007  Augustine et al.
(Continued)

FOREIGN PATENT DOCUMENTS

CN            101482160 A      7/2009

OTHER PUBLICATIONS

Patent Acts 1977: Search Report under Section 17(5), Application No. GB1504960.4, dated Sep. 3, 2015.
(Continued)

*Primary Examiner* — David M Fenstermacher
(74) *Attorney, Agent, or Firm* — MacMillan, Sobanski & Todd, LLC (57) ABSTRACT

A gearbox assembly for an electric power assisted steering apparatus comprises a gearbox housing which houses a worm shaft and a gear wheel, the worm shaft being supported relative to the housing by a main bearing at an end closest to the motor and by a tail bearing at an end furthest from the motor, and the gear wheel being supported by an output shaft having at least one end that provides a take-off from the gearbox assembly, in which the main bearing and tail bearing are free to move relative to the housing through a limited range of motion that enables the worm shaft to pivot away from the wheel gear facilitated by tilting of the main bearing about a pivot that is fixed relative to the housing, characterised in that the gearbox assembly is arranged such that the pivot reacts the axial component of the worm shaft tooth load that arises when a gearwheel torque is applied to the gearwheel in a first direction but not (Continued)

in a second, opposing, direction, and in that a tensioning device is provided that reacts the axial component of the worm shaft tooth load that arises when a gearwheel torque is applied to the gearwheel in the second direction but not in the first direction.

10 Claims, 5 Drawing Sheets

(51) Int. Cl.
    *F16H 1/16*       (2006.01)
    *F16H 57/021*    (2012.01)
    *F16H 57/028*    (2012.01)
    *F16H 57/039*    (2012.01)
    *F16H 57/12*     (2006.01)

(52) U.S. Cl.
    CPC ......... *F16H 57/021* (2013.01); *F16H 57/028* (2013.01); *F16H 57/039* (2013.01); *F16H 57/12* (2013.01); *F16H 2057/0213* (2013.01); *F16H 2057/127* (2013.01)

(56) References Cited

U.S. PATENT DOCUMENTS

| | | | | |
|---|---|---|---|---|
| 2009/0314114 A1* | 12/2009 | Grosberg | ................ | F16H 55/24 74/409 |
| 2012/0125132 A1* | 5/2012 | Bernhard | ............. | B62D 5/0409 74/89.14 |
| 2012/0227526 A1* | 9/2012 | Lescorail | ................ | F16H 55/24 74/406 |
| 2012/0272765 A1* | 11/2012 | Fuechsel | ............. | B62D 5/0409 74/416 |
| 2013/0025960 A1* | 1/2013 | Hama | .................. | B62D 5/0409 180/444 |
| 2014/0020973 A1* | 1/2014 | Galehr | ................ | B62D 5/0409 180/444 |
| 2015/0040699 A1* | 2/2015 | Hafermalz | ............ | F16H 57/039 74/89.16 |

OTHER PUBLICATIONS

PCT International Search Report and the Written Opinion, Application No. PCT/GB2016/050779 filed Mar. 21, 2016, dated Jun. 2, 2016.

\* cited by examiner

GEARBOX ASSEMBLY FOR AN ELECTRIC POWER STEERING ASSEMBLY

CROSS-REFERENCE TO RELATED APPLICATIONS

This application is a national stage of International Application No. PCT/GB2016/050779, filed 21 Mar. 2016, the disclosures of which are incorporated herein by reference in entirety, and which claimed priority to Great Britain Patent Application No. 1504960.4, filed 24 Mar. 2015, the disclosures of which are incorporated herein by reference in entirety.

BACKGROUND OF THE INVENTION

This invention relates to gearbox assemblies for electric power steering assemblies.

Electric power steering systems use an electric motor to produce an assistance torque that is applied to a rotating part of the steering system. In a conventional arrangement this torque assists the driver in turning the wheel. Because motors work best at relatively high speeds and because compact motors produce relatively low torques, the connection between the output of the motor and the steering column is usually through a reduction gearbox.

Figure 1:
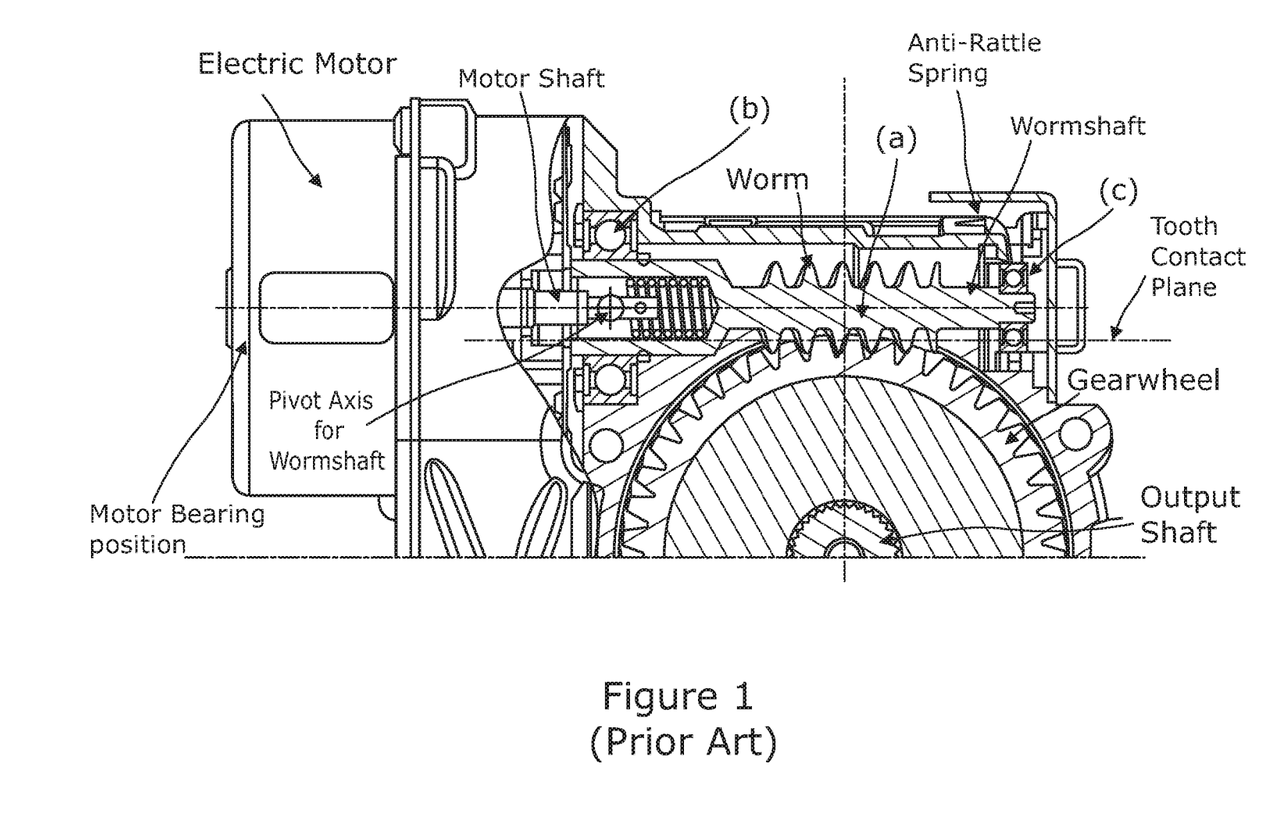
FIG. 1 is part cross section view of a prior art gearbox assembly for an electric power assisted steering system.

The most widely used type of electric power assisted steering reduction gearboxes are of a relatively simple worm and gear configuration similar to that shown in FIG. 1 of the accompanying drawings The gearbox typically comprises a gearbox housing which houses a worm shaft and a gear wheel. The worm shaft is connected to the output of an electric motor. The motor may be secured to an end face of the housing or even located within the housing. The worm shaft is supported by a main bearing at an end closest to the motor and a tail bearing at an end furthest from the motor, both bearings typically comprising ball bearings supported within an inner bearing race that is threaded onto the worm shaft and an outer bearing race that is secured to the housing. The function of the bearings is to allow the worm shaft to rotate whilst to a certain degree limiting axial and radial movement as will be explained. The gear wheel is connected to an output shaft of the gearbox and located so that teeth of the gear wheel engage teeth of the worm shaft.

By choosing appropriate design parameters, this type of gearbox can be made to provide a large speed reduction ratio within compact dimensions. They use a single gear set having a low sliding friction coefficient between the teeth, typically less than 0.05, so that they are "back-driveable". I.e., so that the gear can drive the worm almost as efficiently as the worm can drive the gear. This last attribute is essential for the safety of EPS systems of the kind in which the steering wheel is physically connected to the road wheels enabling some steering effect in the event of a fault at the motor or any other part of the motor control and drive system.

It is known that the speed reduction gearboxes used in electrical power-assisted steering (EPS) apparatus are prone to rattle due to external torsional vibrations acting at their output shafts. These vibrations originate at the road wheels due to surface roughness or unbalanced wheels. Alternatively, mechanical noise can arise from sudden torque reversals applied at the steering wheel by the driver.

The main rattle sites in a worm and wheel gearbox are shown in FIG. 1:—
  (a) at the engagement of the worm and gear teeth and
  (b) at the "main" ball bearing which axially locates the worm shaft.

A well-known solution to the rattle at site (a), namely the so-called "Sprung Worm" mechanism, tends to exacerbate the rattle problem at site (b). An example of such a prior art arrangement is shown in FIG. 1 of the accompanying drawings. In the "Sprung Worm" mechanism, a biasing means such as a leaf spring applies a biasing force that urges the worm shaft into engagement with the wheel gear, the biasing force being chosen such that at low gearwheel torques a dual-flank contact of the worm and gearwheel teeth is achieved while ensuring that there is a transition to single-flank contact between the worm and wheel gear at higher gearwheel torques.

The biasing means requires a small amount of radial movement of the worm shaft and this is achieved by allowing it to pivot around its axis in the plane of the gearwheel by a small angle (typically less than +/−0.5 degrees) either side of its nominal position around an axis which is nominally at the centre of the main bearing at (b). This movement is controlled by
  (i) a specially configured tail bearing at site (c) that is allowed to move by small amounts (typically less than +/−0.5 mm) in a vertical guiding device such as a linear bearing, and
  (ii) the main bearing at (b) has sufficient internal axial clearance between its balls and the sides of its race grooves to permit a small articulation (i.e. tilting) angle which is typically less than +/−0.5 degrees.

Unfortunately, the said axial clearance in the bearing at (b) inevitably allows relative axial free play between the inner and outer races of up to +/−0.2 mm, promoting rattle noises from the bearing when there are reversing torque impulses at the [[O]] output [[S]] shaft. These rattle noises can be partly, but not entirely, suppressed by applying a heavy axial biasing force to the worm shaft.

As stated earlier, if dual-flank contact can be maintained for gearwheel torque levels of up to a certain level, say 4 Nm, then gear rattle will not be serious problem in general driving. The said 4 Nm is referred to as the "kick-out" torque because it is the gearwheel torque at which the "normal" component of the tooth flank contact force is just sufficient to overcome the inward action of the biasing means and thereby causes the worm shaft to pivot outwards. The outward pivoting movement of the worm shaft is limited by the travel allowed at the tail bearing by its vertical guide. The downward biasing force required on the worm shaft tail bearing to achieve a 4 Nm kick-out torque is typically around 12N, equating to around 20N of downward force at the middle of the worm. The kick-out torque is the same for both directions of torque transmission only if the main bearing is pivoted in the tooth contact plane. If the worm shaft is pivoted at the main bearing centre, as shown in FIG. 1, or in any horizontal plane parallel to the nominal worm axis other than that of the tooth contact point, the kick-out torque with be different for the two directions of torque transmission due to the moments created by the axial component of the force resulting from the gearwheel torque.

A significant disadvantage of employing the above described "sprung-worm" method of gear rattle suppression is that the biasing means acting on the tail bearing causes an extra amount quiescent (i.e. background) friction in the gearbox. The increase is typically around a 0.5 Nm compared with a so-called "fixed-centre gearbox" having no worm shaft articulation. This increase is due to the extra rubbing friction which is created between the flanks of the worm and gearwheel teeth when they are forced into mesh by the ARS. The effect is exacerbated both by the "wedge" shape of the teeth, which is a function of their slope or "pressure angle", and by the fact that extra rotational drag felt at the worm shaft is multiplied by the gearbox ratio (typically around 20:1) when measured at the gearwheel axis.

BRIEF SUMMARY OF THE INVENTION

According to a first aspect the invention provides a gearbox assembly for an electric power assisted steering apparatus comprising:
a gearbox housing which houses a worm shaft and a gear wheel,
the worm shaft being supported relative to the housing by a main bearing at an end closest to the motor and by a tail bearing at an end furthest from the motor, and the gear wheel being supported by an output shaft having at least one end that provides a take-off from the gearbox assembly,
in which the main bearing and tail bearing are free to move relative to the housing through a limited range of motion that enables the worm shaft to pivot away from the wheel gear facilitated by tilting of the main bearing about a pivot that is fixed relative to the housing,
characterised in that the gearbox assembly is arranged such that the pivot reacts the axial component of the worm shaft tooth load that arises when a gearwheel torque is applied to the gearwheel in a first direction but not in a second, opposing, direction, and
in that a tensioning device is provided that reacts the axial component of the worm shaft tooth load that arises when a gearwheel torque is applied to the gearwheel in the second direction but not in the first direction.

Within the meaning of this specification, the term first direction of gearwheel torque may refer to the direction which tends to cause the teeth of the gearwheel that are in contact with the worm to move away from the motor and results in an axial force component F2axial that tends to move the worm shaft away from the motor. In the example embodiment shown this corresponds to a clockwise turning of the gearwheel. Similarly, the term second direction of gearwheel torque may be opposite to that first direction, i.e. the gearwheel teeth that contact the worm are biased to move towards the motor and the resultant axial force Faxial1 tends to move the worm shaft towards the motor.

The gearbox of the present invention can, in various embodiments, achieve a reduction of quiescent friction in the gearbox relative to a prior art arrangement in which the worm shaft pivots around its central axis for both clockwise and anti-clockwise gearwheel torques and always reacts the axial forces for both directions by removing the need for a large anti rattle biasing spring to keep the worm and wheel in contact. In its place, careful control of the moments generated as gearwheel torque is applied allows for a lower quiescent friction due to the ability to use a lower quiescent worm wheel biasing force.

In a most preferred arrangement, the pivot may be positioned below the plane of contact between the teeth of the gearwheel and worm gear. Doing so ensures that the axial force for gearwheel torques in the first direction acts against the normal force.

The plane containing the pivot may be spaced from the contact plane by substantially the same vertical distance as the worm shaft axis is above that plane of contact.

In a convenient arrangement, the tensioning device may react the axial force produced for a given gearwheel torque in the second direction by generating a reaction force along the axis of the worm shaft.

The tensioning device may therefore react the axial component of the force for the second direction of gearwheel torque in line with the axis of the worm shaft. This results in the creation of an advantageous moment that opposes movement of the worm shaft away from the wheel gear due to the normal component of the force resulting from the gearwheel torque in the second direction. This is significant improved on the prior art, where the axial component for a gearwheel torque in the second direction in fact works with the normal component to push the worm away from the gear wheel.

The tensioning device may be located at the tail bearing end of the worm shaft.

The tensioning device may generate a force along the axis of the worm shaft that, with no gearwheel torque applied, is reacted by the pivot and cause the worm shaft to be pushed onto the wheel gear.

The tensioning device may comprise a tensioning spring that acts between the tail bearing and the shaft to generate a force that opposes the axial force due to gearwheel torque in the second direction, thereby resisting movement of the worm shaft toward the motor. For gearwheel torques in the first direction the tensioning device does not generate an opposing force and instead allows forces applied to the worm shaft away from the motor to be reacted by the pivot.

The spring may be effective only in one direction, providing no resistance to attempted movement of the worm shaft away from the motor due to gearwheel torques in the first direction so that the pivot can react these axial forces rather than the tensioning spring.

The tensioning device may comprise a carrier for the worm shaft tail bearing which is part of a linear bearing arrangement which also includes two parallel generally vertical arrays of bearings, such as steel balls, which roll or slide in parallel pairs of generally vertical grooves in a moving part that moves with the tail bearing and in a fixed part of the carrier that is fixed to the housing, the tensioning device further including a spring that acts between the worm shaft and the moving part of the carrier that retains the bearings in the grooves, the spring resisting axial movement of the worm shaft for the second direction of gearwheel torque.

The spring of the tensioning device may be pre-compressed towards the carrier by an adjustable nut at the non-drive end of the worm shaft to prevent the bearing from losing contact with the said grooves.

The spring of the tensioning device may have a high spring rate, so that for a small movement of the worm shaft towards the motor a rapid increase in opposing axial force is generated.

The tensioning device may generate a moment that presses the worm shaft towards the wheel gear, and to balance this a biasing spring may be provided that acts on the tail bearing with a force that acts to bias the worm shaft away from the wheel gear. The force created by this biasing spring may be chosen to almost, but not entirely, cancel the moment created by the tensioning device.

The worm shaft may be supported so that it can slide axially relative to the main bearing when a gearwheel torque is applied in the second direction but cannot slide axially relative to the main bearing when a gearwheel torque is applied in the first direction.

With such a configuration, the assembly may be arranged so that, in use. the main bearing always rotates/tilts about the pivot and this defines the pivot point about which the worm shaft tilts for gearwheel torques in the first direction (clockwise), when there is little or no axial movement of the worm shaft relative to the main bearing, but for the second direction (anti-clockwise) gearwheel torques the worm shaft has a virtual pivot centre elsewhere due to the additional axial sliding motion occurring between the worm shaft and the bearing.

The pivot may comprise a part of a pivot assembly that may comprise at least one pivot part defining the pivot axis, and a bearing carrier or gimbal that supports the main bearing, the bearing carrier being biased into engagement with the pivot by a pivot pre load spring.

The bearing carrier may be separate from the main bearing or an integral part of the main bearing. For instance where the main bearing is an annular bearing, an outer bearing race may act as the bearing carrier if it is suitably shaped.

The pivot preload spring may act between the main bearing or the main bearing carrier and a first shoulder defined by the worm shaft. The first shoulder may face away from the motor.

The worm shaft may also include a second shoulder that faces away from the motor and the main bearing or carrier so that, in use, the main bearing or carrier may contact the second shoulder when zero gearwheel torque is applied and when a gearwheel torque is applied in the first direction to provide a positive connection between worm shaft, main bearing and pivot, the second shoulder separating from the main bearing or main bearing carrier when gearwheel torque is applied in the second direction to ensure that the pivot does not react the resulting axial forces along the worm shaft.

In a most advantageous arrangement, the tensioning device, the pivot pre load spring and the location of the second shoulder may be set so that there is substantially zero preload force between the main bearing or carrier and the second shoulder when no gearwheel torque is applied. Thus, as soon as an axial force is applied along the worm shaft toward the motor the second shoulder and main bearing will separate, ensuring the axial force is not reacted by the pivot.

The first and second shoulders may be defined by a ring protruding from the worm shaft defining a step change in diameter. Of course, a continuous ring is not essential and the shoulder could take other forms. For instance, one or more lugs may be provided that project from the worm shaft towards the motor end that the spring/main bearing/bearing carrier can react against.

The preload pivot spring ensures that the main bearing and carrier do not separate, removing a possible source of rattle. This can be of a relatively low spring rate.

The pivot may be located on the opposite side of the main bearing carrier to the motor and in one arrangement, the pivot may comprise one or more spherically ended components which are fixed to the gearbox housing in the plane of the pivot axis such that a hemi-spherical surface at one end of each is exposed, the main bearing being pressed into a carrier or "gimbal" in which there are hemi-spherical sockets at positions corresponding to those of the said embedded spherically ended components.

The spherical components may be at least partly embedded in a face of the gearbox housing.

The worm shaft may be connected to the motor through a motor rotor pin having a spherical head that engages a bush that is located within in a bore in the end of the worm shaft and is free to slide along the bore against a motor preload spring. The motor pre-load spring may bias the worm shaft away from the motor.

Each of the bearings may comprise an annular bearing, typically comprising an inner bearing race connected to the worm shaft and an outer bearing race connected indirectly to the housing (through the pivot or linear bearing), the inner and outer races being free to rotate relative to a common axis coincident with the axis of the worm shaft by bearings that are located in tracks in each of the races. The main bearing and tail bearing should prevent unwanted radial movement of the inner bearing (and hence worm shaft) relative to the outer bearing (and hence the housing).

Other advantages of this invention will become apparent to those skilled in the art from the following detailed description of the preferred embodiments, when read in light of the accompanying drawings.

DETAILED DESCRIPTION OF THE INVENTION

Figure 3:
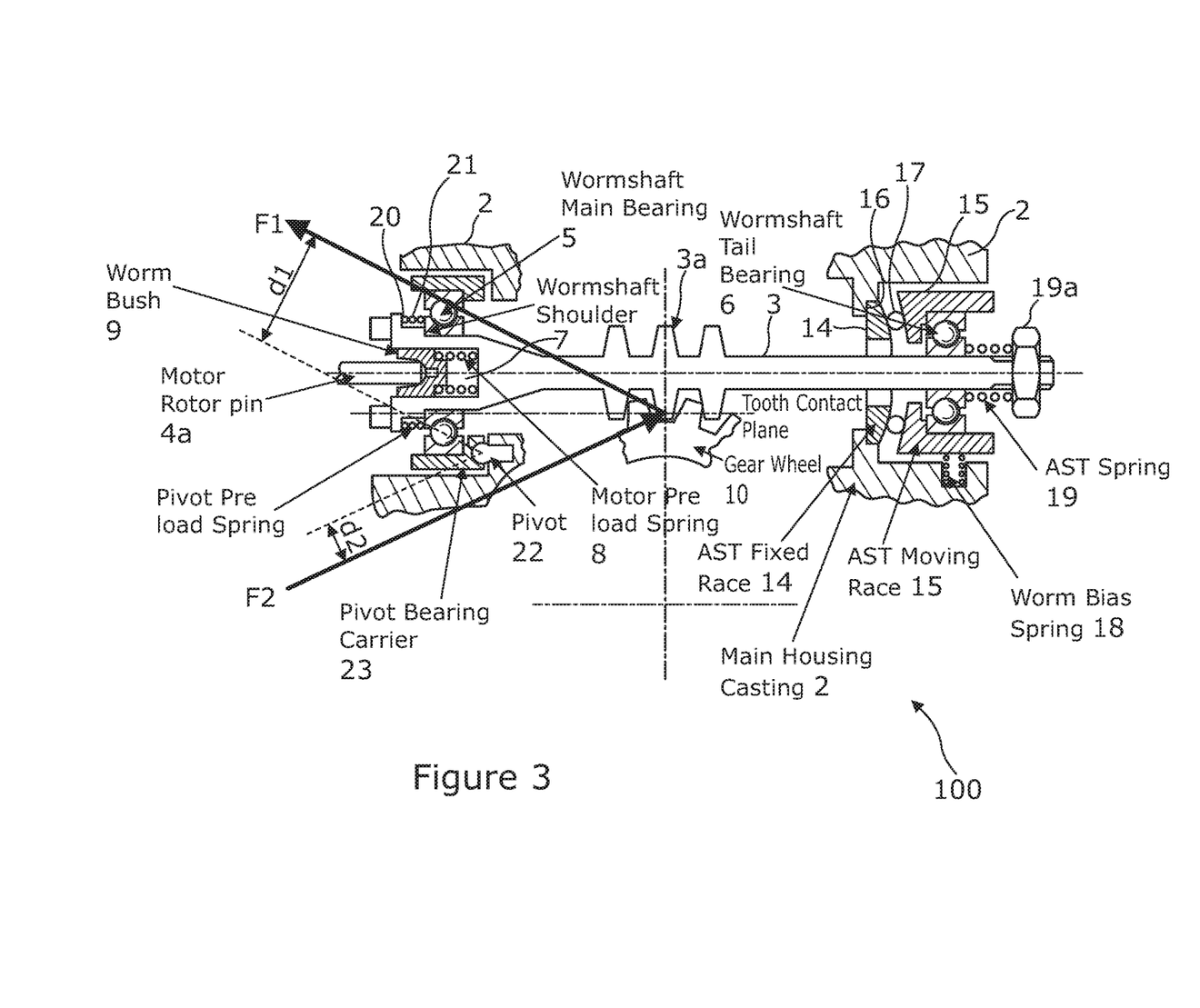
FIG. 3 is a cross section view of an embodiment of a gearbox assembly for an electric power assisted steering system in accordance with the present invention.
Figure 4:
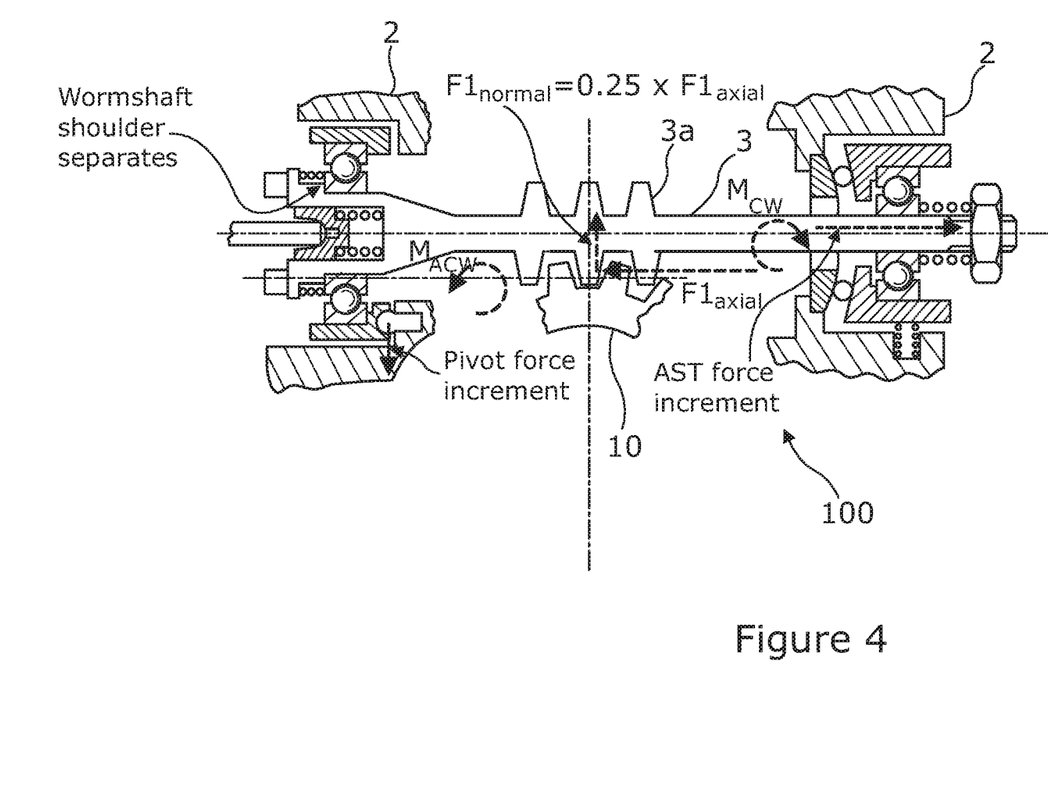
FIG. 4 is a view corresponding to FIG. 3 showing the moments generated by the tensioning device as an anti-clockwise gearwheel torques is applied.
Figure 5:
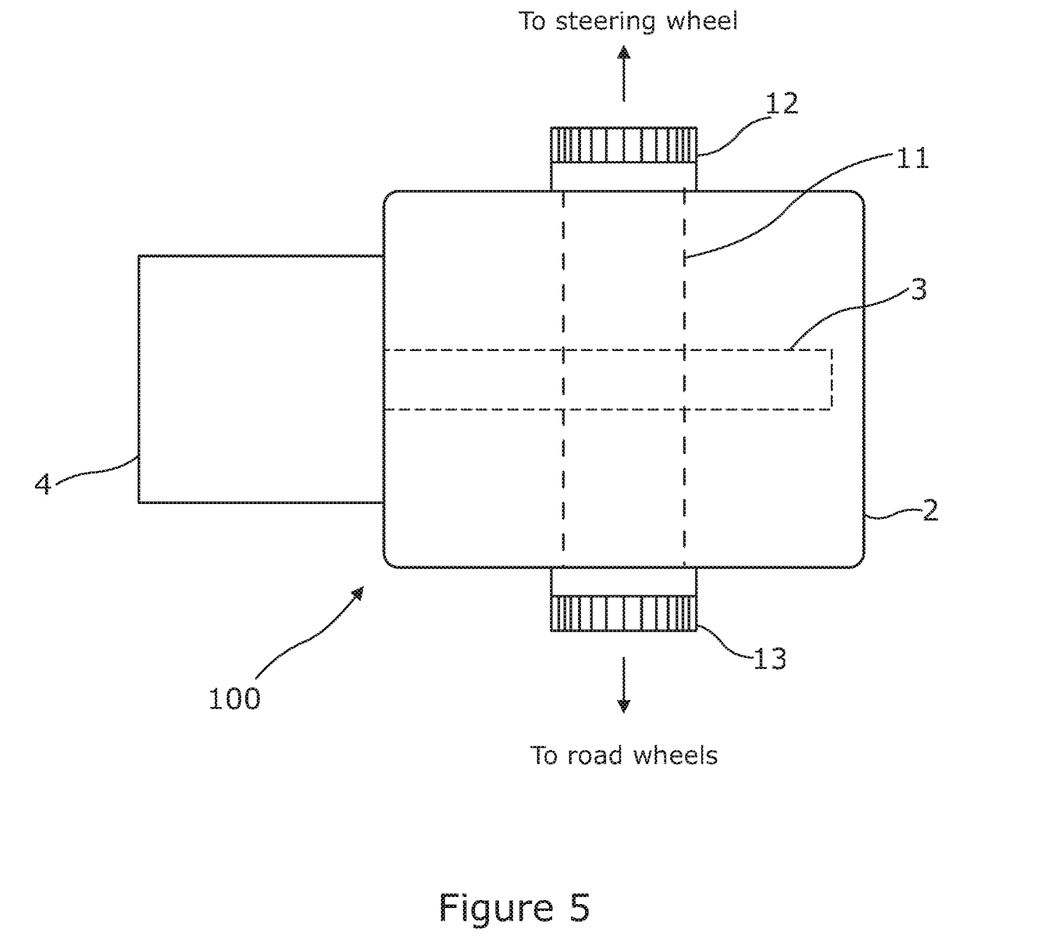
FIG. 5 is an overview of the gearbox assembly of FIGS. 3 and 4 showing the relative position of the motor, worm shaft and wheel shaft in the housing.

FIGS. 3, 4 and 5 show an embodiment of a gearbox assembly 100 in accordance with an aspect of the Invention that can be incorporated into an electric power assisted steering apparatus. In use the gearbox assembly 100 provides a geared reduction in the output of an electric motor of the steering apparatus, allowing torque generated by the motor to be transferred to the steering column or rack (or other part of the steering system), the torque assisting the driver to turn the wheel or providing the principle source of steering torque.

The gearbox assembly 100 comprises a gearbox main housing casing 2 which houses a worm shaft 3, shown in FIGS. 3 and 4, connected to the rotor of an electric motor 4 through a pin 4a. The worm shaft 3 comprises an elongate shaft that carries a worm gear 3a. The shaft 3 is supported by a main bearing 5 at the side of the worm 3a that is closest to the motor 4 and by a tail bearing 6 at an end of the shaft 3 furthest from the motor 4. Both bearings 5, 6 comprise an annular inner race that is threaded onto the shaft 3 and an annular outer race supported by the housing, with a set of ball bearings connecting the inner race to the outer race. As will be described both the main bearings are able to move, in use, by a small amount relative to the housing 2 as torque is applied to the gearbox assembly 100.

The worm shaft 3 is connected to the rotor of the motor 4 by inserting an end of the rotor pin (that is secured to the rotor) into a bore 7 formed in the end of the shaft 3. A coil spring 8 is located in the bore, threaded onto the shaft 3. The spring 8 acts between the blind base of the bore and a bush 9 that is slidably located in the bore and engages the rotor pin 4a. The spring applies a force that biases the worm shaft 3 away from the rotor pin 4a, any movement of the shaft towards the motor rotor increasingly compressing the spring. It is also notable that the rotor pin has a spherical head where it engages the sliding bush 9 so that the worm shaft can pivot around the rotor pin. The pivot point for this movement is on the axis of the shaft, although the location of that point along the shaft may vary depending on the exact location of the sliding bush 9 within the bore 7.

The worm 3a is connected to a gear wheel 10 that is also housed in the housing. The wheel 10 is supported on an output shaft 11, the two ends 12, 13 of which are accessible from outside of the gearbox. One end 11 of the output shaft 11 is connected to the steering shaft and onwards to the steering wheel (not shown), and the other end 13 of the output shaft 11 is connected to the steering rack and onwards to the road wheels. The output shaft 11 therefore provides a mechanical path directly from the steering wheel to road wheels in this example and the gear wheel transfers torque from the motor to the output shaft to assist the driver.

The gear wheel 10 and worm gear 3a each have complimentary teeth that are meshed and may be in a single contact or double contact condition. In the former, each worm tooth that is engaged with the worm wheel at a given instant in time will contact at most only a single gear wheel tooth, and in the later condition at least one worm tooth will be in contacts the flanks of two gear wheel teeth at a given instant in time.

The main bearing and tail bearing allow some controlled axial movement of the worm shaft 3 and pivoting of the worm shaft. To avoid rattle both bearings should have minimal free play between the inner and outer races for both radial and axial movement. The manner in which the bearing are supported relative to the housing 2 will now be described.

The tail bearing is connected to the housing in this example through a linear bearing comprising a fixed race 14 and a moving race 15. The fixed race 14 is securely and immovably located relative to the casing by a shoulder 16 and the moving race is fixed to the outer race of the tail bearing 6. The inner race of the tail bearing is secured to the worm shaft 3 so that the worm shaft can slide axially through the inner race. Each race of the linear bearing includes a pair of linear grooves 17 along which ball bearings can roll and slide. The grooves extend in a plane parallel to the plane of the gearwheel so that the tail bearing permits movement of the tail end of the worm shaft towards and away from the gear wheel. Since the worm shaft is generally constrained at the side nearest the motor by the main bearing, this up and down movement of the tail bearing results in pivoting of the worm shaft about the location of the main bearing.

A tensioning device is provided. This comprises a spring 19 that acts between the inner race of the tail bearing 6 and a nut 19a or other stop that is secured to the end of the worm shaft beyond the tail bearing (i.e. the distance between the tail bearing and motor is less than the distance between the nut and the motor). The nut cannot move axially along the worm shaft during normal use. The tension spring 19 comprises a coil spring which is threaded around the shaft 3, the axis of the coil spring being coincident with the axis of the worm shaft.

The compression spring 19 tends to cause the worm shaft to move away from the motor and therefore acts together with the motor pre load spring 8. The nut 19 can be manually adjusted during assembly to set the tension and hence fine tune the axial position of the worm shaft 3 relative to the motor at rest. As will become apparent the action of this tensioning spring also generates a beneficial pivoting moment that pushes the worm 3a onto the wheel gear 10.

To prevent the worm shaft separating from the end of the rotor due to the action of the two springs 8, 19, the worm shaft 3 is provided with a protruding ring at the end closest to the motor that defines a first shoulder 20 that faces away from the motor. A further coil spring 21, referred to here as a pivot preload spring 21, is located on the worm shaft between the shoulder and the worm and engages the shoulder at one end. The other end of the spring 21 contacts the inner race of the main bearing 5 that is also slidably located on the worm shaft between the spring and the worm 3a. The outer race of the main bearing 5 is then located in a bearing carrier 23 that contacts and can pivot about a pivot pin 22 (that defines a pivot point for the main bearing 5) that is secured to the gearbox main housing casing 2 and that faces the motor 4.

A second shoulder is also provided on the worm shaft that is in contact with the inner race of the main bearing when no gearwheel torques are applied. As can be seen this also faces away from the motor close to the first shoulder. Any attempt by the worm shaft to move away from the motor will be reacted by the pivot as the force passes through the second shoulder to the main bearing and bearing carrier.

Any movement of the worm shaft towards the motor separates the second shoulder from the main bearing, so that the axial forces along the worm shaft are not reacted by the main bearing and hence are not reacted by the pivot. The spring 21 keeps the main bearing 5 and pivot 22 in contact.

The bearing carrier acts as a gimbal, allowing some pivoting movement of the main bearing assembly around the pivot 22. The pivot pin 22 is located at a position below the tooth contact plane for the worm and gear wheel. As shown the pivot point lies on an axis which is several millimetres below the plane of the tooth contact. This is achieved by placing the pivot pin 22 at the bottom part of the bearing carrier/gimbal 23. Of course, rather than one pin it is possible to use two pins as long as they are both located at the same offset from the worm shaft axis. Note that the linear bearing for the tail bearing 6 has opposing curved surfaces between which the bearings run, the central axis of the curve being aligned with the axis of the motor rotor and residing at or near the centre of the main bearing 5.

A biasing means, in the form of a small coil spring 18, acts between the housing 2 and the tail bearing outer race to bias the tail bearing in a normal direction away from the gear wheel 10. This biasing means opposes any pivoting forces that would otherwise push the worm gear onto the wheel gear creating excessive friction. The strength of the spring is selected so that, in combination with the actions of springs 8, 19 and 21, it ensures that the desired meshing force occurs between the worm and the wheel when no gear wheel torque is applied.

The three springs 8, 19 and 21, together with the small biasing spring 18, together define the forces at rest acting on the worm shaft.

Through careful selection of the positions and strengths of each spring and the location of the pivot position, the worm may be supported so that there is substantially no force applied to the shoulder/main bearing inner race interface when no external torque is applied to the gearbox. Adjustment of the nut 19a allows this to be fine-tuned. Also, the moment created by the tensioning spring 19 may be balanced by the biasing spring 18 so that a light pressing of the worm shaft onto the wheel gear is obtained that will resist movement of the worm 3a up to a predefined "kick out torque", typically about 4 Nm.

Due to the contact angles of the worm gear and wheel gear, a sudden high torque applied the gearwheel could cause the worm gear to be thrown off the gear wheel by if the biasing force is overcome. To understand what happens we should first consider what forces are at play.

In use, when a clockwise gearwheel torque CW is applied, the main bearing 5 will pivot about the pivot pin if the resulting forces overcome the resting biasing force. When an anti-clockwise gearwheel torque ACW is applied it will also try to pivot about this pivot 22.

Figure 2:
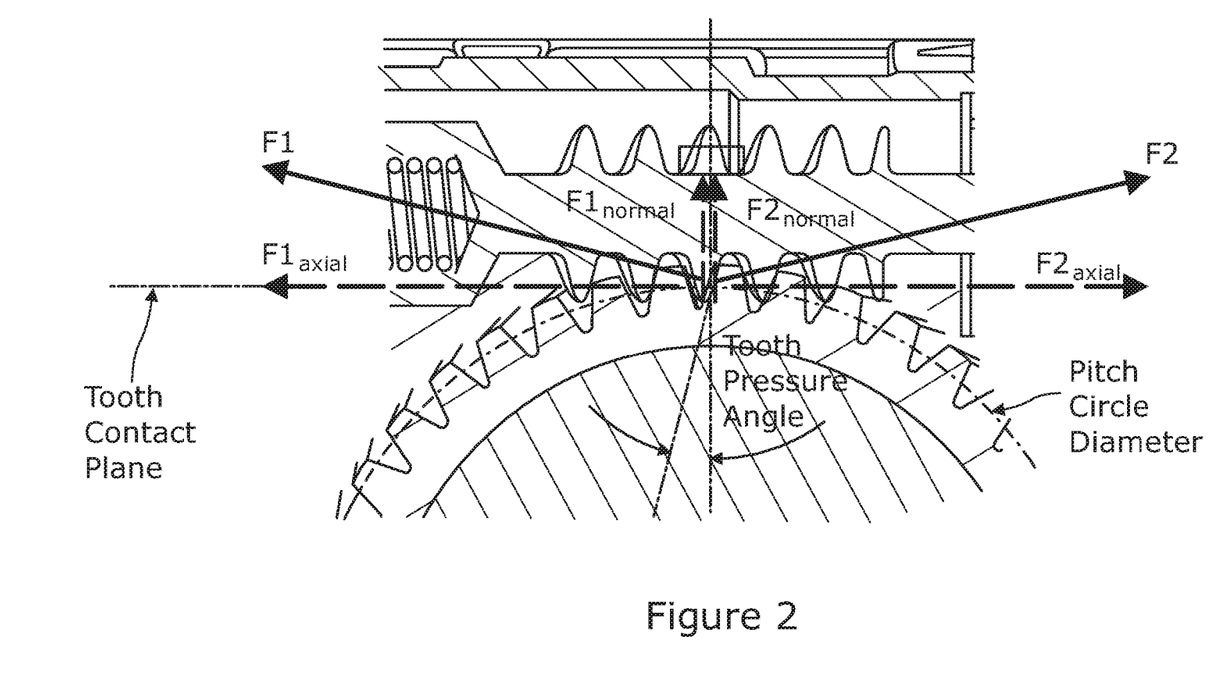
FIG. 2 shows the direction of the forces F1 and F2 applied to the flanks of the worm for a clockwise gearwheel torque and clockwise gearwheel torque in a worm and wheel gearbox.

To explain this attempted movement of the worm shaft, consider first the forces produced at the worm wheel due to a gear wheel torque. For a clockwise torque CW, the force F2 acts in a direction away from the motor and produces component along the axis of the worm shaft F2axial and component normal to the worm shaft axis and away from the wheel, F2normal. Similarly, for an anticlockwise torque ACW, the force F1 acts in a direction towards the motor and produces a component along the axis of the worm shaft F1axial and a component normal to the worm shaft axis and away from the wheel, F1normal. These are shown in FIG. 2, and the forces F1 and F2 are also shown in FIG. 3.

The axial components will attempt to cause the worm shaft to slide axially and this is resisted, depending on the gearwheel torque direction, by the various parts of the gearbox assembly which generate reaction forces which also have an axial component. Due to the offset between the lines of action of these reactive axial components there will also be moments Mcw and Macw created about the pivot pin 22 which tend to cause the worm shaft to want to move away from or toward the wheel gear.

For a clockwise gearwheel torque the component F2axial tries to move the worm shaft away from the motor. This is resisted by the engagement between the second shoulder of the worm shaft that is in contact with the main bearing, which means that the worm shaft is earthed out immediately to the pivot pin through the main bearing and bearing carrier. All the axial force F2axial is reacted by the pivot pin. Because the axial force is along the contact path which is a distance d2 above the pivot point, the axial force creates a moment about the pivot that pushes the worm towards the wheel gear, and acts with the resting biasing force of the tensioning device. This works against the normal component of the force F2normal and keeps the worm and wheel engaged. It is significant that that for clockwise gearwheel torques, the axial forces create a beneficial moment about the pivot pin 22.

For an anticlockwise gearwheel torque, the axial component F1axial tends to try to move the worm shaft towards the motor. This force is opposed by the force of the tension spring 19 and pivot spring 8, the result being that the axial force is not reacted by the pivot but by the tensioning device. Because the axial component F1axial is in the plane of the tooth contact, and the tensioning spring force is in the plane of the worm shaft that is offset from the tooth contact plane, a moment Macw is created. As the worm shaft moves towards the rotor the shoulder on the worm shaft separates from the main bearing, preventing the main bearing and worm shaft moving as one about the pivot 22 and it is this freedom to separate that ensures the force is not reacted by the pivot. Note that the worm shaft separates from the main bearing but the pivot biasing spring ensures the main bearing does not separate from the pivot, retaining the pivot action and preventing a potential source of rattle being formed.

As with the clockwise gearwheel torques, the moment produced by the normal component F1normal of the force F1 is at least partly cancelled out by the biasing force of the tensioning spring 19.

The assembly may be specified so that the axial component of the tooth contact force and the resting forces from the springs balances most, but not all, of the worm shaft's kick-out action caused by the normal component.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A gearbox assembly for an electric power assisted steering apparatus including a motor, the gearbox assembly comprising:
    a gearbox housing which houses a worm shaft and a gear wheel,
    the worm shaft being supported relative to the housing by a main bearing at an end configured to be closest to the motor and by a tail bearing at an end configured to be furthest from the motor, and the gear wheel being supported by an output shaft having at least one end that provides a take-off from the gearbox assembly,
    in which the main bearing and tail bearing are free to move relative to the housing through a limited range of motion that enables the worm shaft to pivot away from the gear wheel facilitated by tilting of the main bearing about a pivot that is fixed relative to the housing,
    wherein the gearbox assembly is arranged such that the pivot reacts an axial component of the worm shaft tooth load that arises when a gear wheel torque is applied to the gearwheel in a first direction but not in a second, opposing, direction, and
    in that a tensioning device is provided that reacts the axial component of the worm shaft tooth load that arises when the gear wheel torque is applied to the gearwheel in the second, opposing, direction but not in the first direction.

2. The gearbox assembly according to claim 1 in which the pivot is positioned on a gear wheel side of a contact plane between teeth of the gear wheel and worm shaft.

3. The gearbox assembly according to claim 2 in which the pivot is spaced from the contact plane by substantially the same vertical distance as an axis of the worm shaft is above the contact plane.

4. The gearbox assembly according to claim 1 in which the tensioning device reacts an axial force produced for a given gearwheel torque in the second, opposing, direction by generating a reaction force along the axis of the worm shaft.

5. The gearbox assembly according to claim 4 in which the tensioning device is located at the tail bearing end of the worm shaft.

6. The gearbox assembly according to claim 5 in which the tensioning device comprises a spring that acts between the tail bearing and the worm shaft to generate a force that opposes the axial force due to gearwheel torque in the second, opposing, direction, thereby resisting movement of the worm shaft toward the motor.

7. The gearbox assembly according to claim 1 in which the worm shaft is supported so that the worm shaft can slide axially relative to the main bearing when a gearwheel torque is applied in the second, opposing, direction but cannot slide axially relative to the main bearing when a gearwheel torque is applied in the first direction.

8. The gearbox assembly according to claim 1 in which the pivot comprises a part of a pivot assembly that comprises at least one pivot part defining the pivot axis, and a bearing carrier or gimbal that supports the main bearing, the bearing carrier being biased into engagement with the pivot by a pivot pre load spring.

9. The gearbox assembly according to claim 8 in which the pivot preload spring acts between the main bearing or the bearing carrier and a first shoulder defined by the worm shaft, the first shoulder facing away from the motor, the worm shaft further also including a second shoulder that faces away from the motor and the main bearing or bearing carrier whereby, in use, the main bearing or bearing carrier contacts the second shoulder when zero gearwheel torque is applied and when a gearwheel torque is applied in the first direction to provide a positive connection between worm shaft, main bearing and pivot, the second shoulder separating from the main bearing or main bearing carrier when gearwheel torque is applied in the second, opposing, direction to ensure that the pivot does not react the resulting axial forces along the worm shaft.

10. The gearbox assembly according to claim 9 in which the tensioning device, the pivot pre load spring and the location of the second shoulder are set so that there is substantially zero preload force between the main bearing or bearing carrier and the second shoulder when no gearwheel torque is applied.

* * * * *